United States Patent [19]

Jahns

[11] Patent Number: 4,649,331

[45] Date of Patent: Mar. 10, 1987

[54] FLUX-WEAKENING REGIME OPERATION OF AN INTERIOR PERMANENT MAGNET SYNCHRONOUS MOTOR

[75] Inventor: Thomas M. Jahns, Schenectady, N.Y.

[73] Assignee: General Electric Company, Schenectady, N.Y.

[21] Appl. No.: 733,160

[22] Filed: May 13, 1985

[51] Int. Cl.$^4$ .............................................. H02P 5/40
[52] U.S. Cl. .................................... 318/798; 318/723; 318/806
[58] Field of Search ............... 318/811, 800, 803, 805, 318/798, 806, 722, 723, 721

[56] References Cited

U.S. PATENT DOCUMENTS

| | | | |
|---|---|---|---|
| 3,775,649 | 11/1973 | Bayer et al. | 318/702 |
| 4,295,085 | 10/1981 | Lafuze | 318/724 |
| 4,361,791 | 11/1982 | Plunkett | 318/723 |
| 4,458,192 | 7/1984 | Sakamoto et al. | 318/811 |
| 4,460,860 | 7/1984 | Schwesig et al. | 318/721 |
| 4,469,970 | 9/1984 | Neumann | 310/156 |
| 4,472,651 | 9/1984 | Jones | 310/156 |
| 4,506,181 | 3/1985 | Jones et al. | 310/156 |

OTHER PUBLICATIONS

Leonhard, W., *Control of Electrical Drives*, Springer-Verlag, 1985, pp. 260–270.
Lajoie-Mazenc et al., *Feeding Permanent Magnet Machines by a Transistorized Inverter*, PCI Motor Converence Proceedings, Sep. 1983, pp. 558–570.

*Primary Examiner*—David Smith, Jr.
*Attorney, Agent, or Firm*—Marvin Snyder; James C. Davis, Jr.

[57] ABSTRACT

The operation of an interior permanent magnet synchronous motor is extended to the constant horsepower regime by causing the stator current vector to follow the voltage-limit ellipse in the counter-clockwise direction. The error between commanded stator current and actual stator current is determined to signal a saturation of the inverter and the commanded stator current is modified to reduce the error.

17 Claims, 12 Drawing Figures

FLUX-WEAKENING REGIME OPERATION OF AN INTERIOR PERMANENT MAGNET SYNCHRONOUS MOTOR

The present invention relates in general to an adjustable speed, interior permanent magnet (IPM) motor synchronous drive system and more specifically to a method and apparatus for extending the operation of such drive system to constant horsepower (flux-weakening regime) operation.

BACKGROUND OF THE INVENTION

In a synchronous machine, the magnetic field of the stator produced by the stator windings interacts with the magnetic field of the rotor, causing the rotor to rotate. The rotor magnetic field may be produced either by dc-excited rotor windings or by permanent magnets. When permanent magnets are used they may be located at the surface of the rotor or may be located in the interior of the rotor, surrounded by pole pieces. In any case, the stator typically comprises multiphase windings and is identical to the stator of an induction motor.

Examples of interior permanent magnet rotors are described in U.S. Pat. No. 4,506,181 issued to Jones et al. on Mar. 19, 1985, U.S. Pat. No. 4,472,651, issued to Jones on Sept. 18, 1984, and U.S. Pat. No. 4,469,970, issued to Neumann on Sept. 4, 1984, all three patents being assigned to the assignee of the present application. Thus, in addition to a rotor core, permanent magnets and pole pieces, an interior permanent magnet rotor may include a squirrel-cage for line starting the motor as an induction motor.

Due to the construction of the interior permanent magnet rotor there are two components to the torque produced by the motor when operating at substantially synchronous speed. First, there is field torque resulting from magnet flux and the stator current, which is present in any permanent magnet synchronous motor. Second, there is reluctance torque due to the saliency of the rotor introduced by the pole pieces. Thus, reluctance torque is present only in the interior permanent magnet motor and total torque is the sum of field torque and reluctance torque.

In view of the mechanisms of torque production, it has been known to control total torque of the interior permanent magnet motor by controlling the amplitude and the orientation of the stator current vector relative to the instantaneous orientation of the rotor magnets. However, prior art control algorithms have failed to provide the full torque producing capability of the motor at high speeds because of the saturation of the current regulated, pulse width modulated (PWM) inverter. Saturation is the phenomenon where, because of the increased back-emf generated by the rotor magnets under such conditions, the source voltage of the inverter becomes insufficient to allow accurate regulation of the instantaneous phase currents required for constant torque operation. As a result, the phase currents drop in amplitude and phase below the commanded levels.

OBJECTS OF THE INVENTION

It is a principal object of the present invention to provide an interior permanent magnet motor synchronous drive system including a motor control which is capable of smooth operation throughout the full useful speed range of the motor.

It is another object of the present invention to provide a method and apparatus for operating an interior permanent magnet motor synchronous drive system in the constant horsepower, flux-weakening regime upon the potential saturation of the current regulator under constant torque operation.

It is a further object of the invention to furnish apparatus for providing constant horsepower operation which is adaptable to motor controls based on either cartesian or polar coordinate expression of line currents in magnitude and time phase relative to the terminal voltage of the motor.

SUMMARY OF THE INVENTION

These and other objects are achieved by a method for constant horsepower operation of an interior permanent magnet motor synchronous drive system. The system includes a current regulated PWM inverter wherein actual stator current is controlled according to a commanded stator current at a prescribed angle in relation to the quadrature axis of the rotor. The method comprises the steps of comparing commanded stator current with actual stator current to obtain a difference signal indicative of the inverter being saturated, integrating the difference signal to provide an error compensation signal, and modifying the commanded stator current such that the angle between commanded stator current and the rotor quadrature axis is increased according to the error compensation signal. This action reduces the difference signal to substantially zero.

The invention is also directed to apparatus for constant horsepower operation and adapted to be connected to a drive system. The drive system includes an interior permanent magnet motor, a shaft position sensor connected to the shaft of the motor for providing signals proportional to shaft position and rotor speed, a PWM current regulated inverter coupled to the motor, and control means coupled to the shaft position sensor and responsive to a speed request signal for providing a commanded stator current having a D-axis component aligned with the direct axis of the rotor and a Q-axis component aligned with the quadrature axis of the rotor. The control means generates the commanded stator current which in constant torque operation provides the minimum current for the instantaneous torque. The drive system further includes a rotor to stator coordinate transformer connected to the shaft position sensor and coupling the control means to the inverter. The apparatus adapted to be connected to the drive system comprises comparison means, a controller block, and modifying means. The comparison means is adapted to be coupled to the control means and to the output of the inverter for comparing the D-axis component of commanded stator current with the D-axis component of actual stator current. The controller block is coupled to the comparison means for generating an error compensation signal. The modifying means is coupled to the controller block and adapted to be coupled to the coordinate transformer for increasing the angle between commanded stator current and the quadrature axis depending on the error compensation signal.

BRIEF DESCRIPTION OF THE DRAWINGS

The novel features of the invention are set forth with particularity in the appended claims. The invention itself, however, as to organization and method of operation, together with further objects and advantages thereof, may best be understood by reference to the following description taken in conjunction with the accompanying drawings, in which:

DETAILED DESCRIPTION OF THE INVENTION

Figure 1:
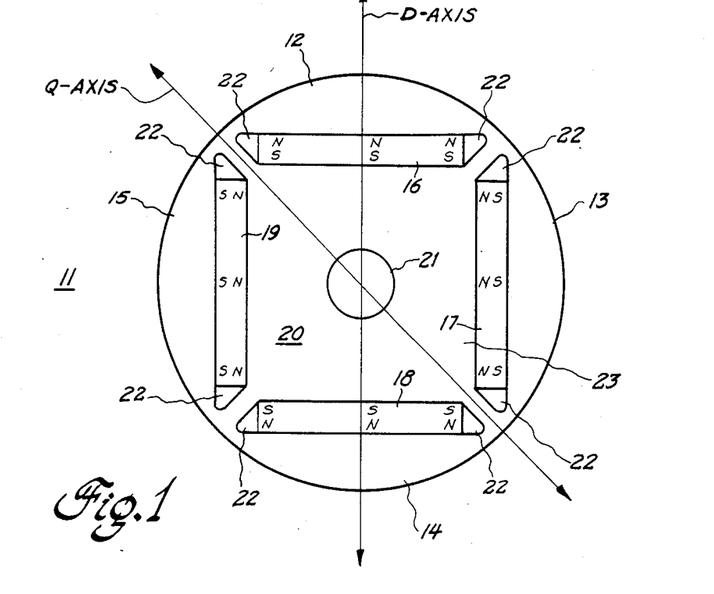
FIG. 1 is a cross-sectional view of an interior permanent magnet rotor showing the D-axis and Q-axis.

An exemplary interior permanent magnet rotor is shown in cross section in FIG. 1. A rotor 11 is comprised of a stack of rotor laminations 20 connected to a shaft 21. Each lamination 20 has a plurality of pole pieces 12–15. Permanent magnets 16–19 are inserted between pole pieces 12–15, respectively, and rotor lamination core 23. N and S indicate the north and south poles of magnets 16–19. Axial voids 22 may be cast with aluminum to help retain magnets 16–19 and to form a portion of a starting cage.

In the rotor of FIG. 1, the permanent magnets are arranged to form a four pole rotor. Rotor 11 has a direct axis, or D-axis, in line with the rotor north pole center line. A quadrature axis, or Q-axis, is located 90 electrical degrees from the D-axis between adjacent poles. In the four pole rotor, the Q-axis is 45 mechanical degrees from the D-axis. Although the present invention is described for a four pole rotor, it can be generalized to other numbers of poles (e.g. 2, 6, etc.) with the understanding that the Q-axis is located between adjacent poles.

Figure 2:
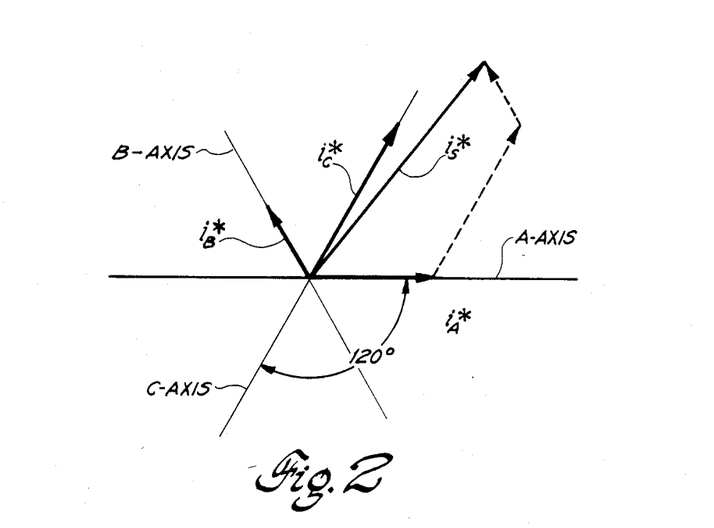
FIG. 2 is a vector diagram of commanded stator current $i_S^*$.

The torque developed by the IPM motor has previously been controlled by governing the amplitude and the orientation of the commanded stator current vector to the instantaneous orientation of the Q-axis. Commanded stator current vector $i_S^*$ is the vector sum of the instantaneous phase currents. Assuming a three phase machine, individual phase currents are denoted $i_A^*$, $i_B^*$, and $i_C^*$ separated by 120° in the stator of the IPM motor. FIG. 2 shows the individual phase currents and their vector sum, $i_S^*$. With reference to the phase A axis of the stator, total stator current vector $i_S^*$ rotates at the synchronous speed of the motor. Thus, considered in steady state conditions, $i_S^*$ remains fixed in the rotating reference frame of the rotor, i.e. with respect to the D-axis and Q-axis.

Figure 3:
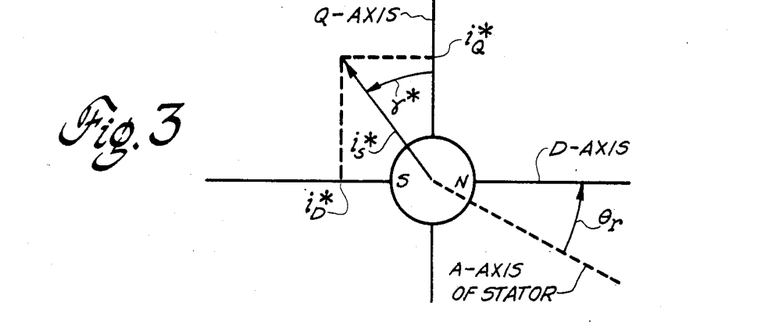
FIG. 3 is a diagram of the position of commanded stator current $i_S^*$ relative to the Q-axis of FIG. 1.

Stator current vector $i_S^*$ will be further explained with reference to FIG. 3. As shown by FIG. 3, $i_S^*$ may be specified in polar coordinates by the amplitude (or magnitude) of $i_S^*$ ($|i_S^*|$) and an angle $\gamma^*$ from the Q-axis, or in cartesian coordinates by a D-axis component $i_D^*$ and a Q-axis component $i_Q^*$. The instantaneous torque $T^e$ developed as a result of actual stator current $i_S$ at an actual angle $\gamma$ from the Q-axis, may be expressed as:

$$T^e = k_1 \psi_f |i_S| \cos \gamma + k_2 |i_S|^2 \sin 2\gamma$$

where $k_1$ and $k_2$ are machine constants and $\psi_f$ is the magnet flux vector which is aligned with the D-axis.

Based on the above equation, it is possible to define a desired trajectory for stator current $i_S^*$ to follow in the rotating reference frame (of FIG. 3) in response to an increasing torque request $T^{e*}$ which results in optimum operation, e.g. maximum torque per stator current amplitude. This trajectory can be expressed generally in polar coordinates by:

$$|i_S^*| = f_1(T^{e*}) \text{ and}$$

$$\gamma^* = f_2(T^{e*}).$$

It will be obvious to those skilled in the art that the trajectory could just as easily be expressed in cartesian coordinates since $i_D^* = -i_S^* \sin \gamma^*$ and $i_Q^* = i_S^* \cos \gamma^*$.

Figure 5:
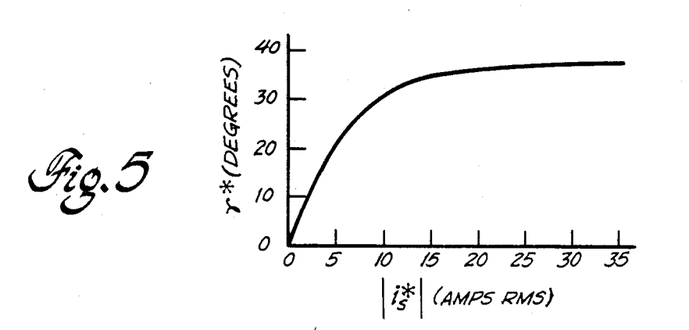
FIG. 5 is a plot of the optimum value for the angle $\gamma$ as implemented in the control of FIG. 4.

Optimization of motor operation has been attempted in the prior art by varying $\gamma^*$ depending on stator current amplitude $|i_S^*|$ in order to maximize the torque/amp ratio. An example is given by Lajoie-Mazenc et al., "Feeding Permanent Magnet Machines by a Transistorized Inverter", PCI Motor Conference Proceedings, September 1983. Expressed in symbols consistent with those used here, the functions $f_1$ and $f_2$ are derived by combining the above torque equation with the following constraint equation:

$$\gamma^* = \arcsin\left( \frac{\sqrt{\psi_f - \psi_f^2 + 8(L_d - L_q)^2 |i_S^*|^2}}{4(L_d - L_q)|i_S^*|} \right)$$

where $L_d$ and $L_q$ are the direct and quadrature inductances, respectively, of the motor. The resulting value of $\gamma^*$ for varying stator current, determined for a typical IPM motor, is shown in FIG. 5.

A prior art speed controller for an IPM motor which governs stator current $i_S$ as described above may be structured as shown in FIG. 4. This apparatus uses a current regulated inverter 30 connected to an IPM motor 29 as well known in the art and described, for example, in U.S. Pat. No. 4,361,791, issued to Plunkett and assigned to General Electric Company. The instantaneous phase currents $i_A$, $i_B$ and $i_C$ supplied by inverter 30 are forced to their commanded values $i_A^*$, $i_B^*$, and $i_C^*$, respectively, by comparing the current signals from current sensors 40–42 with the commanded values and employing a hysteresis type of control to force the actual values to follow the commanded values.

Figure 4:
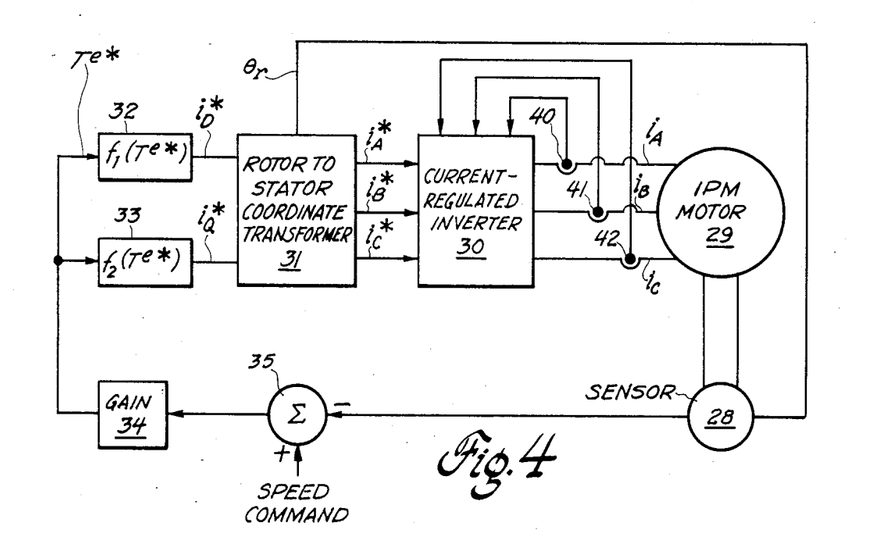
FIG. 4 is a block diagram of a drive system utilizing the control method of the prior art.

The apparatus of FIG. 4 also includes elements to determine the optimum stator current vector $i_S^*$ and to translate this value in the rotating reference frame into the stationary reference frame. An external speed command (e.g., a speed request from an operator) is compared in a summer 35 with actual rotor speed $\omega_r$ derived from a shaft position sensor 28. The output signal of summer 35 is passed through a feedback loop gain 34 producing a torque request $T^{e*}$ which represents the torque needed to conform actual speed to the speed command. Gain 34 may for example comprise a conventional proportional-integral controller, as known in the art. Function blocks 32 and 33 receive the output signal of gain 34 and provide as output signals the D and Q components, respectively, of an optimized commanded stator current vector $i_S*$. Function blocks 32 and 33 may typically comprise piecewise-linear analog function generators or, alternatively, memory look-up tables in a digital implementation.

A rotor to stator coordinate transformer 31 receives input signals $i_D*$ and $i_Q*$ (or $i_S*$ and $\gamma*$) from function blocks 32 and 33 and a rotor position signal $\theta_r$ from shaft position sensor 28. Coordinate transformer 31 computes the instantaneous phase currents $i_A*$, $i_B*$ and $i_C*$ corresponding to the commanded stator current vector $i_S*$ by (1) locating $i_S*$ in the stationary (stator) reference frame, and (2) finding the three corresponding phase current values. Since the angle $\theta_r$ between the stator phase A axis and the rotor D-axis is known, $i_S*$ may be fixed in the stator reference frame, using trigonometry, as having a phase A axis component $i_{SA}*$ and a component perpendicular to the phase A axis, $i_{SP}*$. With $i_S*$ described in coordinates $i_D*$ and $i_Q*$, coordinate transformer 31 could, for example, use the equations:

$$i_{SA}* = i_D* \cos \theta_r - i_Q* \sin \theta_r$$

$$i_{SP}* = i_D* \sin \theta_r + i_Q* \cos \theta_r$$

Phase current commands $i_A*$, $i_B*$ and $i_C*$ are derived by coordinate transformer 31 from $i_{SA}*$ and $i_{SP}*$. This three-to-two phase conversion employs the constraint that the sum of the magnitudes of the phase currents must equal zero. Therefore, an algebraic summing circuit in coordinate transformer 31 generates $i_A*$, $i_B*$ and $i_C*$ which are supplied to inverter 30. Coordinate transformer 31 may be comprised of known hardware for performing the described trigonometric functions, such as memory look-up tables to provide $\sin \theta_r$ and $\cos \theta_r$ values, and multiplying digital-to-analog (D/A) converters to perform the necessary multiplications.

Figure 6:
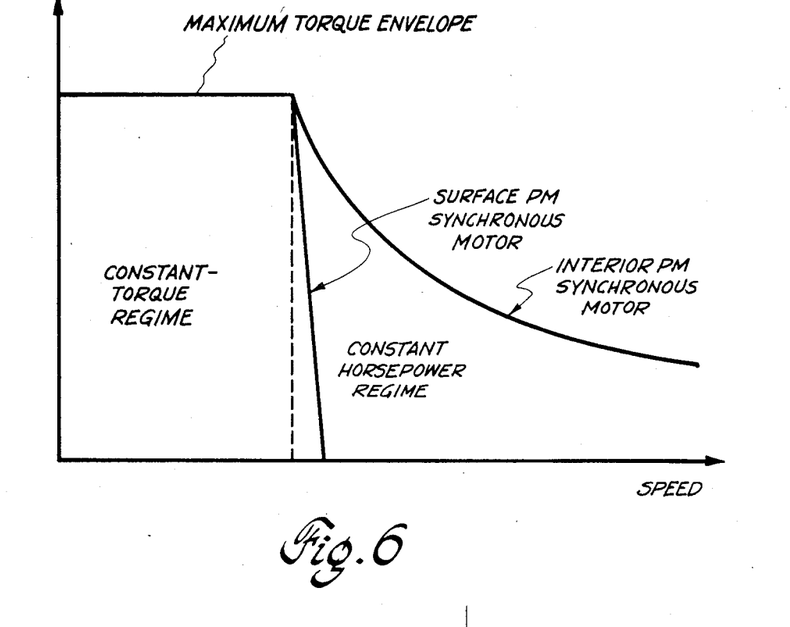
FIG. 6 shows the torque producing capability of an IPM motor throughout its useful speed range.

The prior art IPM motor control described thus far operates at a minimum current for any value of torque desired and allows torque to be linearly controlled, but achieves these objectives only at motor speeds below a certain limit. This limitation of the prior art corresponds to its ability to operate only in the constant torque regime. As shown by the torque-speed curve of an IPM synchronous motor in FIG. 6, the maximum torque envelope defines two modes of operation, a constant torque regime and a constant horsepower or flux-weakening regime. In contrast, the surface permanent magnet motor has almost no flux weakening capability because it lacks the production of reluctance torque as in the IPM motor.

Referring to the apparatus of FIG. 4, at low values of $T^{e*}$, phase currents $i_A*$, $i_B*$ and $i_C*$ are able to follow their commands resulting in a shaft torque which also follows its commanded value. However, when $T^{e*}$ exceeds a certain threshold, the pulse-width modulation of the inverter phases disappears (six-step voltage excitation arises) and the phase currents begin to significantly lag their references in amplitude and phase. Therefore, the shaft torque falls off to a level below the capabilities of the IPM motor in the constant horsepower regime.

Figure 7:
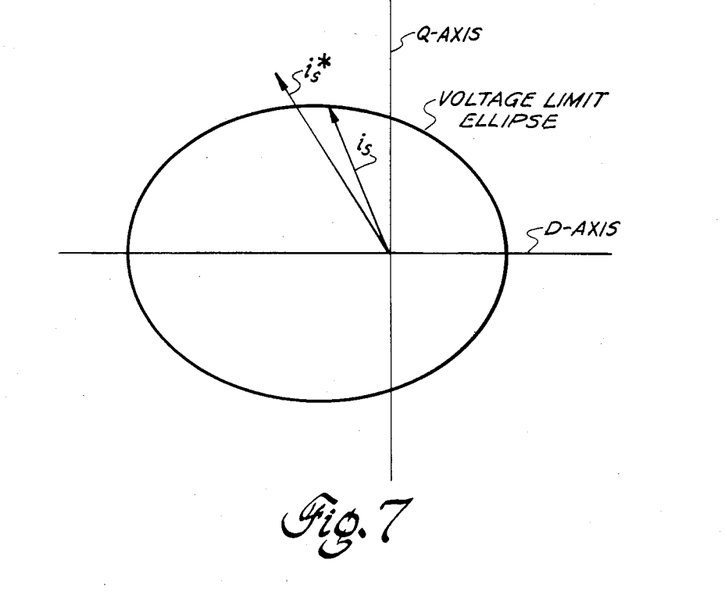
FIG. 7 is a plot of the difference between commanded stator current $i_S^*$ and actual stator current $i_S$ when the regulator of FIG. 5 becomes saturated.

For an IPM motor driven by a current regulated inverter at any particular speed, the saturation limit of the inverter can be expressed in the D-Q rotating reference frame as an ellipse, which is shown in FIG. 7. The actual value of the stator current vector $i_S$ cannot extend outside this ellipse because of the finite source of voltage. Furthermore, as motor speed increases, the area of the ellipse diminishes because of a rising back-emf. The trajectory for $i_S*$ defined by $f_1$ and $f_2$ of FIG. 4 inevitably crosses the voltage-limit ellipse causing the current regulator to saturate in the constant horsepower regime. As the current command $i_S*$ is increased outside the ellipse by the controller of FIG. 4, the actual current $i_S$ follows the ellipse clockwise toward the Q-axis as shown in FIG. 7. This behavior of $i_S$ causes the shaft torque to fall off dramatically.

The key to the motor control of this invention is the recognition that torque can be increased above the level obtained at the $i_S*$-ellipse intersection by commanding the stator current vector $i_S$ to follow the ellipse in the counter-clockwise direction. Thus, torque can monotonically increase up to a maximum level associated with a particular voltage, current and speed.

According to the invention, it is possible to recognize that an intersection with the voltage-limit ellipse is being approached by comparing $i_D*$ with the D-axis component $i_{dm}$ of actual stator current $i_S$ to obtain a difference signal. The difference signal may be integrated to produce an error compensation signal. The commanded stator current $i_S*$ may then be modified such that $i_S$ is commanded to follow the ellipse in the counter-clockwise direction, thus reducing the difference signal to zero.

Figure 8A:
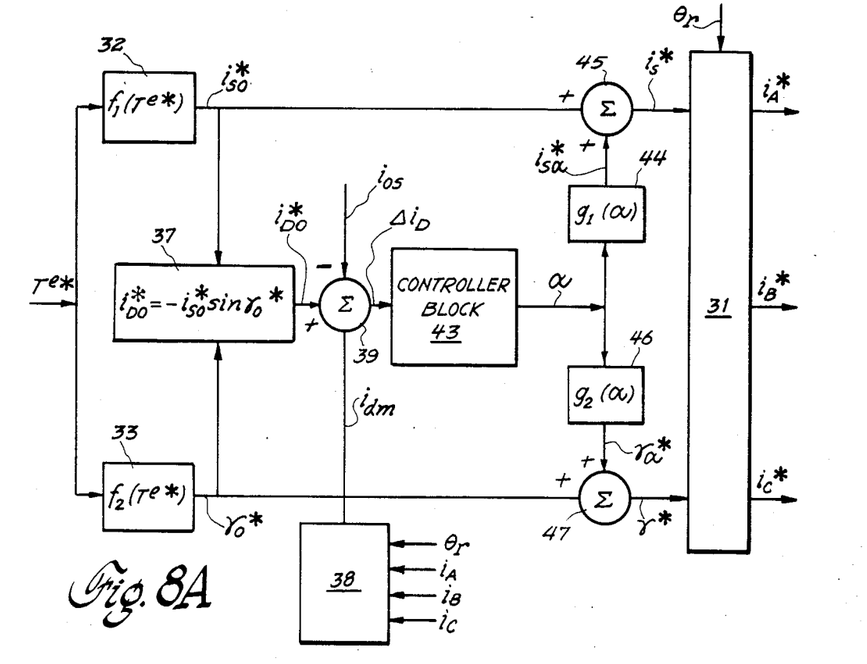
FIG. 8A is a block diagram of apparatus for implementing the control method of the present invention, and FIG. 8B plots the trajectory of commanded stator current $i_S^*$ for an increasing torque request obtained by using the apparatus of FIG. 8A.

The apparatus of the present invention is adapted to be coupled to the speed controller of the prior art (FIG. 4). A first illustrative embodiment of the invention is shown in FIG. 8A along with a portion of the control of FIG. 4. This embodiment is shown with a control based on $i_S*$ being described in polar coordinates. In order to compare commanded and actual D-axis components of stator current, a calculating circuit 37 calculates $i_{DO}*$ from $i_{SO}*$ and $\gamma_O*$. The new subscript O used here denotes the commanded variable prior to being modified by the method of the invention. A calculating circuit 38 finds the D-axis component of actual stator current $i_{dm}*$ from $\theta_r$ (obtained from sensor 28 shown in FIG. 4) and $i_a$, $i_b$ and $i_c$ (obtained from current sensors 40-42 shown in FIG. 4). Circuit 38 finds $i_{dm}$ based on the trigonometric equation:

$$i_{dm} = i_A \cos \theta_r + i_B \cos (\theta_r - 2\pi/3) + i_C \cos (\theta_r - 4\pi/3).$$

A difference signal $\Delta i_D$ is derived in a summer 39 which calculates $\Delta i_D = i_{DO}* - i_{dm}$. Since there is always some finite amount of error between $i_{DO}*$ and $i_{dm}$ even before saturation due to the hysteresis limits of inverter 30, a small constant current offset $i_{OS}$ may also be provided to summer 39 so that this error is not mistaken for a saturation.

The growth of $\Delta i_D$ marks an impending saturation of the current regulators. Difference signal $\Delta i_D$ is an input to a controller block 43 which provides a negative gain and which preferably is a standard proportional-integral controller. Thus, the integrated difference signal yields an error compensation signal $\alpha$ as the output of controller block 43.

Error compensation signal $\alpha$ is used to alter $i_S^*$ by incremental amounts $i_{S\alpha}^*$ and $\gamma_\alpha^*$ (or, alternatively, $i_{D\alpha}^*$ and $i_{Q\alpha}^*$). These increments are defined by:

$$i_{S\alpha}^* = g_1(\alpha) \text{ and}$$

$$\gamma_\alpha^* = g_2(\alpha)$$

and are implemented in function blocks 44 and 46. The output signal of block 44 is summed with $i_{SO}^*$ in a summer 45 to provide $i_S^*$. The output signal of block 46 is summed with $\gamma_O^*$ in summer 47 to provide $\gamma^*$. Functions $g_1(\alpha)$ and $g_2(\alpha)$ could provide increments described in either polar or cartesian coordinates.

Figure 8B:
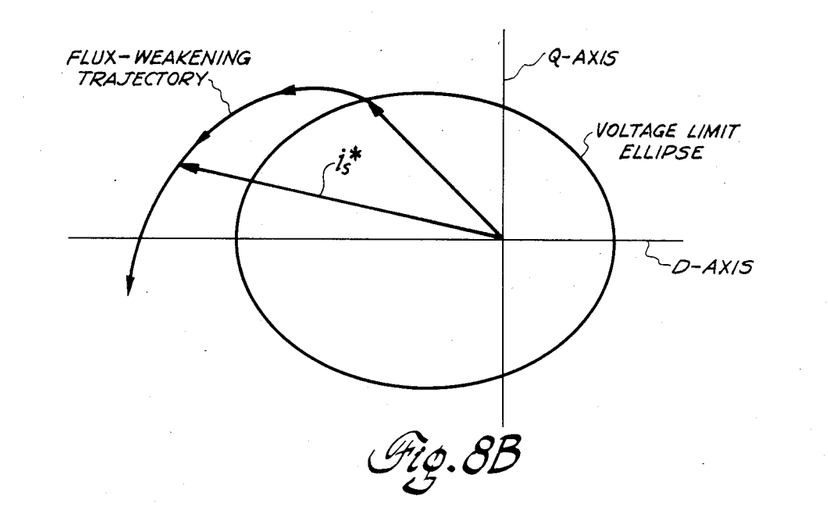

Functions $g_1$ and $g_2$ cannot be specified uniquely since there are an infinite number of specific trajectories which current command vector $i_S^*$ can follow outside the ellipse in order to force the desired movement of stator current vector $i_S$ along the ellipse. FIG. 8B shows just one example of an acceptable trajectory of the command vector in the saturated-regulator regime to achieve increasing torque levels. Although the functions $g_1$ and $g_2$ cannot be uniquely defined, it is possible to state certain necessary conditions which the resulting current command trajectory must meet. These are:

(1) For rotation in the positive (counter-clockwise) direction, current command vector $i_S^*$ in the saturated-regulator regime must be rotated in the positive direction with respect to the current-regulated current vector trajectory inside the ellipse. That is, $g_2$ must be a monotonically increasing function of error compensation signal $\alpha$ in order to increase angle $\gamma^*$.

(2) The function $g_1$ setting the amplitude of current command vector $i_S^*$ must be defined in coordination with $g_2$ such that the current command vector in the saturated-regulator regime never crosses back inside the ellipse at any speed.

By defining functions $g_1$ and $g_2$ in accordance with these conditions, the new control loop will regulate in the proper manner to drive the D-axis current error $\Delta i_D$ to zero. In the process, the control algorithm will cause the drive to deliver monotonically increasing shaft torque as the torque request is raised in the high-speed saturated regulator regime. The maximum available shaft torque at any speed will be determined by either the maximum limit on the phase current amplitudes, or the maximum torque along the voltage-limit ellipse at that speed, whichever occurs first.

Since in the embodiment of FIG. 8A, $i_S^*$ follows a trajectory outside the ellipse, such as shown in FIG. 8B, the drive operates with six-step voltage excitation throughout the flux-weakening regime. However, by sacrificing a small portion of the regained torque, better dynamic response and partial recovery of current regulator control may be obtained by bringing the trajectory of $i_S^*$ back inside the ellipse. This control strategy is realized in the preferred embodiments shown in FIGS. 9 and 10.

Figure 9A:
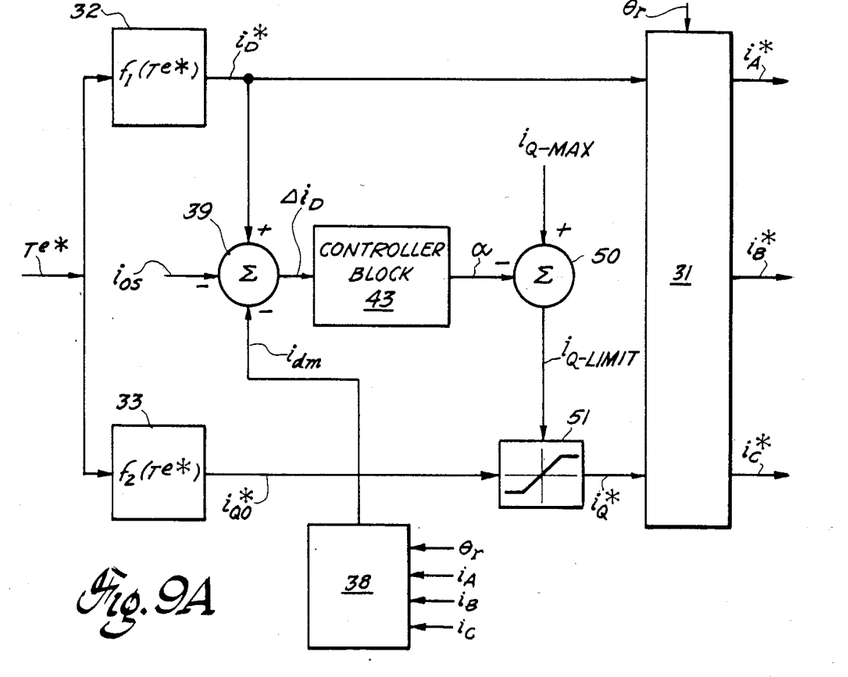
FIG. 9A is a block diagram of the preferred embodiment of apparatus for implementing the control method of the present invention, and FIG. 9B plots the commanded stator current $i_S^*$ trajectory for the embodiment of FIG. 9A.

The preferred embodiment of FIG. 9A is shown in conjunction with a control which describes $i_S^*$ in cartesian coordinates. Thus, a separate calculating circuit, such as circuit 37 of FIG. 8A, is not needed. Error compensation signal $\alpha$ is generated in the same way by calculating circuit 38, summer 39 and controller block 43. In this embodiment signal $\alpha$ is compared in a summer 50 with a signal $i_{Q\text{-}max}$ which represents a maximum allowed $i_Q^*$. The $i_{Q\text{-}max}$ signal may be a constant absolute maximum for all motor speeds or could be stored for each speed in a look-up table for better response. The output of summer 50 is a limit signal $i_{Q\text{-}limit}$ which sets the limits of a bipolar limiter 51. Thus, when $\alpha$ indicates an impending saturation of the current regulators, $i_{Q\text{-}Limit}$ is decreased, overriding the $i_{QO}^*$ command and forcing it to a lower level by means of bipolar limiter 51.

Figure 9B:
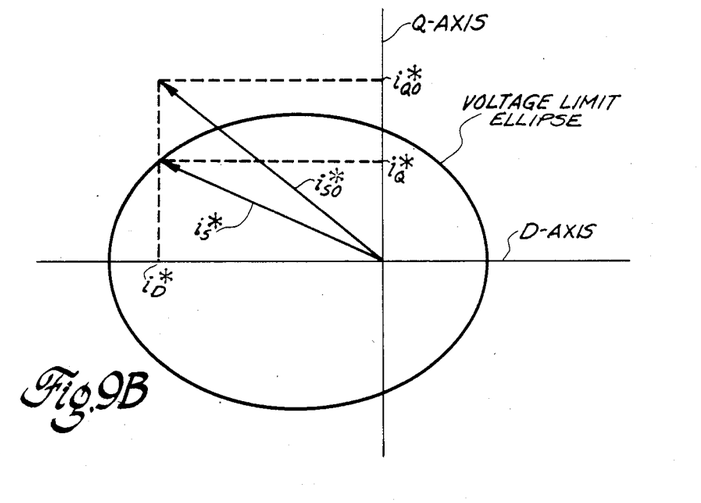

By depressing the Q-axis current command $i_Q^*$, an initial stator current command which lies outside of the voltage limit ellipse can be forced back down inside the ellipse along a trajectory shown in FIG. 9B. Once back inside the ellipse, the current regulators are again able to perform their functions and force correspondence between the commanded and actual current vectors. In the process, the difference signal $\Delta i_D$ is forced to zero, illustrating the negative-feedback nature of this flux-weakening algorithm. The final position of the current vector shown in FIG. 9B results in significantly higher torque production than with the vector position occurring without flux weakening.

Figure 10:
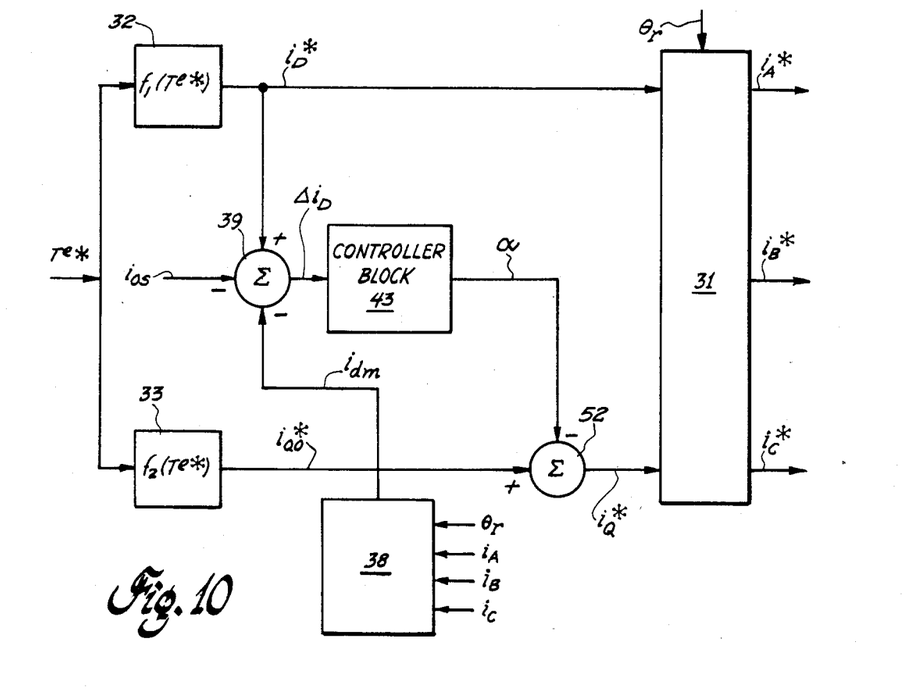
FIG. 10 is a block diagram of a second preferred embodiment.

A further embodiment similar to that of FIG. 9A is shown in FIG. 10. Thus, summer 50 and bipolar limiter 51 of FIG. 9A are replaced with a summer 52 directly reducing $i_{QO}^*$ by $\alpha$. The steady-state operation of this configuration is identical to that of the configuration of FIG. 9A, but transient performance is slightly reduced.

The foregoing describes an IPM motor synchronous drive system which includes adjustable, flux-weakening, constant horsepower regime operation. The capabilities of the drive are extended by providing a smooth transition into flux-weakening operation at elevated speeds, while entering flux-weakening regime only when necessary. This controller automatically recognizes the proper conditions for performing this transition at any motor speed, load torque or dc bus voltage.

It will be obvious that the described apparatus could, in addition to discrete components, be realized on either a digital or analog computer. Furthermore, the shaft position sensor could be eliminated if motor speed and shaft position were derived in an alternative manner. Although all of the described embodiments assume counterclockwise rotation of the motor, extension of the control principles to clockwise rotation would merely require a change of polarity of appropriate signals or of summer inputs since in a reversal of rotation the $i_Q$ component reverses polarity while the $i_D$ component is unchanged.

While preferred embodiments of the present invention have been shown and described herein, it will be obvious that such embodiments are provided by way of example only. Numerous variations, changes and substitutions will occur to those skilled in the art without departing from the invention herein. Accordingly, it is intended that the invention be limited only by the spirit and scope of the appended claims.

What is claimed is:

1. A method for constant horsepower operation of an interior permanent magnet motor synchronous drive system, said system including a current regulated PWM inverter wherein actual stator current in the motor is controlled according to a commanded stator current at a prescribed angle in relation to the quadrature axis of said rotor, said method comprising the steps of:

comparing commanded stator current with actual stator current to obtain a difference signal whose growth is indicative of said inverter being saturated;

integrating said difference signal to provide an error compensation signal; and modifying said commanded stator current such that the angle between commanded stator current and said rotor quadrature axis is increased according to said error compensation signal, so that said difference signal is reduced to substantially zero.

2. The method of claim 1 wherein said commanded stator current is modified by limiting the component of said commanded stator current which is aligned with said rotor quadrature axis.

3. The method of claim 2 wherein the limit of said component is determined according to the speed of said rotor.

4. The method of claim 2 wherein the limit of said component is fixed.

5. An apparatus for providing constant horsepower operation of an interior permanent magnet motor synchronous drive system, said drive system including an interior permanent magnet motor; position means connected to said motor for providing signals proportional to shaft position and rotor speed; a PWM current regulated inverter coupled to said motor; control means coupled to said position means and responsive to a speed request signal for providing a commanded stator current having a D-axis component aligned with the direct axis of the rotor of said motor and a Q-axis component aligned with the quadrature axis of said rotor, said control means generating said commanded stator current which in constant torque operation provides the minimum current for the instantaneous torque; and a rotor to stator coordinate transformer connected to said position means and coupling said control means to said inverter; said apparatus comprising:

comparison means adapted to be coupled to said control means and to the output of said inverter for comparing said D-axis component of said commanded stator current with the D-axis component of actual stator current;

a controller block coupled to said comparison means for generating an error compensation signal; and modifying means coupled to said controller block and adapted to be coupled to said coordinate transformer for increasing the angle between said commanded stator current and said quadrature axis depending on said error compensation signal.

6. The apparatus of claim 5 wherein said controller block comprises a proportional-integral controller.

7. The apparatus of claim 5 wherein said modifying means comprises a bipolar limiter having its threshold set according to the difference between said error compensation signal and a Q-maximum signal representing the maximum allowed magnitude of said Q-axis component.

8. The apparatus of claim 7 wherein said modifying means further comprises threshold means coupled to said controller block and adapted to be coupled to said position means for generating said Q-maximum signal according to said rotor speed.

9. The apparatus of claim 5 wherein said modifying means comprises a summing junction for providing a modified commanded stator current Q-axis component equal to the difference between the Q-axis component of said commanded stator current and said error compensation signal.

10. The apparatus of claim 5 wherein said modifying means comprises:

a first function means coupled to said controller block and adapted to be coupled to said coordinate transformer, said first function means providing a modified commanded stator current magnitude such that said inverter provides six-step voltage excitation to said motor during constant horsepower operation; and a second function means coupled to said controller block and adapted to be coupled to said coordinate transformer, said second function means providing a modified commanded stator current having an angle from said quadrature axis which is monotonically increasing for an increasing error compensation signal.

11. An interior permanent magnet motor synchronous drive system comprising:

an interior permanent magnet motor;

position means connected to said motor for providing signals proportional to shaft position and rotor speed;

a PWM current regulated inverter coupled to said motor;

control means coupled to said position means and responsive to a speed request signal for providing a commanded stator current having a D-axis component aligned with the direct axis of the rotor of said motor and a Q-axis component aligned with the quadrature axis of said rotor, said control means generating said commanded stator current which in constant torque operation provides the minimum current for the instantaneous torque;

a rotor to stator coordinate transformer connected to said position means and coupling said control means to said inverter;

comparison means coupled to said control means and to the output of said inverter for comparing said D-axis component of said commanded stator current with the D-axis component of actual stator current;

a controller block coupled to said comparison means for generating an error compensation signal; and modifying means coupled to said controller block and to said coordinate transformer for increasing the angle between said commanded stator current and said quadrature axis depending on said error compensation signal.

12. The apparatus of claim 11 wherein said controller block comprises a proportional-integral controller.

13. The apparatus of claim 11 wherein said modifying means comprises a bipolar limiter having its threshold set according to the difference between said error compensation signal and a Q-maximum signal representing the maximum allowed magnitude of said Q-axis component.

14. The apparatus of claim 13 wherein said modifying means further comprises threshold means coupled to said controller block and to said position means for generating said Q-maximum signal according to said rotor speed.

15. The apparatus of claim 11 wherein said modifying means comprises a summing junction for providing a modified commanded stator current Q-axis component equal to the difference between the Q-axis component of said commanded stator current and said error compensation signal.

16. The apparatus of claim 11 wherein said modifying means comprises:
a first function means coupled to said controller block and to said coordinate transformer, said first function means providing a modified commanded stator current magnitude such that said inverter provides six-step voltage excitation of said motor during constant horsepower operation; and a second function means coupled to said controller block and to said coordinate transformer, said second function means providing a modified commanded stator current having an angle from said quadrature axis which is monotonically increasing for an increasing error compensation signal.

17. The apparatus of claim 11 wherein said position means comprises a shaft position sensor.

* * * * *